(12) United States Patent
Bywaters (10) Patent No.: US 8,226,347 B2
(45) Date of Patent: Jul. 24, 2012

(54) VARIABLE SPEED OPERATING SYSTEM AND METHOD OF OPERATION FOR WIND TURBINES

(75) Inventor: Garrett Lee Bywaters, Waitsfield, VT (US)

(73) Assignee: Northern Power Systems Utility Scale, Inc., Barre, VT (US)

( * ) Notice: Subject to any disclaimer, the term of this patent is extended or adjusted under 35 U.S.C. 154(b) by 1302 days.

(21) Appl. No.: 11/928,365

(22) Filed: Oct. 30, 2007

(65) Prior Publication Data

US 2009/0110540 A1    Apr. 30, 2009

(51) Int. Cl.
*F03D 11/00* (2006.01)
(52) U.S. Cl. ............................... 415/1; 415/118
(58) Field of Classification Search ............... 415/47, 415/118, 119, 1; 416/35, 61, 244 R, 500; 290/44, 55; 52/167.4
See application file for complete search history.

(56) References Cited

U.S. PATENT DOCUMENTS

| | | | | |
|---|---|---|---|---|
| 3,818,712 A * | 6/1974 | Burt et al. | ...................... | 405/229 |
| 4,590,718 A * | 5/1986 | Angeloff | .......................... | 52/116 |
| 5,590,506 A * | 1/1997 | Cunningham | ............... | 52/741.3 |
| 6,692,567 B1 | 2/2004 | Tatom et al. | | |
| 6,891,280 B2 * | 5/2005 | Siegfriedsen | ................... | 290/44 |
| 2003/0201645 A1 * | 10/2003 | Pacheco | .......................... | 290/54 |
| 2005/0200133 A1 * | 9/2005 | Wobben | .......................... | 290/55 |
| 2006/0018719 A1 * | 1/2006 | Stern | ............................. | 405/217 |
| 2007/0176428 A1 * | 8/2007 | Nagao | ............................. | 290/44 |

OTHER PUBLICATIONS

International Search Report and Written Opinion issued Jan. 30, 2009, in International Application No. PCT/US2008/081775.

* cited by examiner

*Primary Examiner* — Edward Look
*Assistant Examiner* — Aaron R Eastman
(74) *Attorney, Agent, or Firm* — Downs Rachlin Martin PLLC; Dave S. Christensen, Esq.

(57) ABSTRACT

A wind turbine system is provided for geographic regions having multiple soil layers, such as permafrost. The wind turbine includes a plurality of blades mounted to a nacelle on top of a tower. The tower is supported by a foundation that extends through or into the multiple soil layers. The wind turbine monitors the condition of a top layer of soil and calculates a natural frequency for the wind turbine system based on the changes to the layer of soil. Changes in operation of the wind turbine are made in response to changes in the natural frequency of the wind turbine system.

21 Claims, 6 Drawing Sheets

VARIABLE SPEED OPERATING SYSTEM AND METHOD OF OPERATION FOR WIND TURBINES

BACKGROUND OF THE INVENTION

The present invention relates generally to a system and method of operation for controlling a wind turbine, and in particular a system and method of controlling a wind turbine located in geographic regions having permafrost.

In colder northern climates and certain areas of higher elevation, there are regions where the subsurface soil remains frozen year-round. This frozen soil phenomena is commonly referred to as permafrost. Permafrost formed over hundreds of thousands of years in regions where the average yearly air temperature is less than 0° C. In arctic and sub-arctic regions, such as the Alaskan Arctic Plain the permafrost may be up to 650 meters thick and have a soil temperature between −9 to −11° C.

While the soil remains frozen in permafrost regions, a portion of the soil, referred to as the active layer, will thaw during summer months and then refreeze during the winter. The depth of the active layer will vary depending on the latitude of the location, the local geography and the weather. During the summer, the active layer will typically be between 0.5 to 4 meters thick. Due to high levels of ice content in the active layer, depending on the drainage conditions of the area, the active layer may become over saturated with water. Where saturation occurs, trees and other vegetation may die or tilt due to a lack of support by the soil.

Structures that are built in permafrost regions need to account for the seasonal variability in the soil condition. Commonly, structures are built on pilings that are driven past the bottom of the active layer into area of the soil that remains frozen year round. In this way, even if the active layer becomes over saturated with water during the summer, the structures and buildings remain stable.

Due to recent global climate changes, which are expected to continue, annual average temperatures have risen steadily. As a result of these climate changes, the regions where permafrost is found will continue to recede into colder areas. Even in areas where permafrost remains, the active layer will grow in depth with the increased temperatures. The increase in size of the active layer may cause issues for structures located in permafrost regions, such as buildings, roads, electric power transmission lines and other tall structures such as wind turbines. Further, structures may have foundational issues as the increase in the active layer reduces the length of the pilings that are supported by permafrost. These structural issues are magnified in tall structures such as wind turbines the change in foundational support may also change the operational characteristics of the wind turbine.

While existing wind turbine control systems are suitable for operating in arctic regions having permafrost, there remains a need for improvements, particularly regarding the control of wind turbines to account for changing soil conditions.

SUMMARY OF THE INVENTION

A wind turbine for operating in regions having soil that includes an active layer that thaws during a portion of the year and a permafrost layer is disclosed. The wind turbine includes at least one piling having a first portion in the permafrost layer and a second portion in the active layer. A tower is mounted to the piling. A nacelle is mounted to the tower opposite said platform and has a plurality of turbine blades is mounted thereto. A controller is operably coupled to the plurality of turbine blades and a sensor is electrically coupled to the controller. The sensor is adapted to generate a signal indicative of a condition of the active layer.

A wind turbine for operation in an environment having a soil with a first and second layer is also provided. The wind turbine includes a nacelle arranged to be mounted on a tower. An electrical generator is mounted to the nacelle. A plurality of turbine blades is mounted for rotation to the electrical generator. A sensor is associated with the nacelle where the sensor is disposed to measure a parameter and transmit a signal that represents a condition in the first soil layer. A controller is associated with the nacelle and disposed in communication with the sensor. The controller includes a processor responsive to executable computer instructions for changing the operational frequency of the plurality of turbine blades in response to a change in the parameter.

A method for controlling a wind turbine being operated in an environment having a first soil layer and a second soil layer is also provided. The method includes the step of sensing a characteristic representing the condition of the first soil layer. A physical characteristic of the wind turbine is determined based on the sensed characteristic. Finally, an operational parameter is changed in response to a change in the physical characteristic.

BRIEF DESCRIPTION OF THE DRAWINGS

Referring now to the drawings, which are meant to be exemplary and not limiting, and wherein like elements are numbered alike.

DETAILED DESCRIPTION

Electrical power may be generated by many different methods. The most common methods involve the boiling of water using fossil or nuclear based fuels. The steam produced by the boiling is used to rotate a turbine that drives an electrical generator to create the electrical power. While these common methods are very efficient, they also have undesirable side effects, such as the production of toxic pollutants, or the rely on a dwindling natural resource. One alternate method of creating electrical power is to harness a renewable natural resource such as the wind to be a driving force to rotate the electrical generator to produce the electricity.

Figure 1:
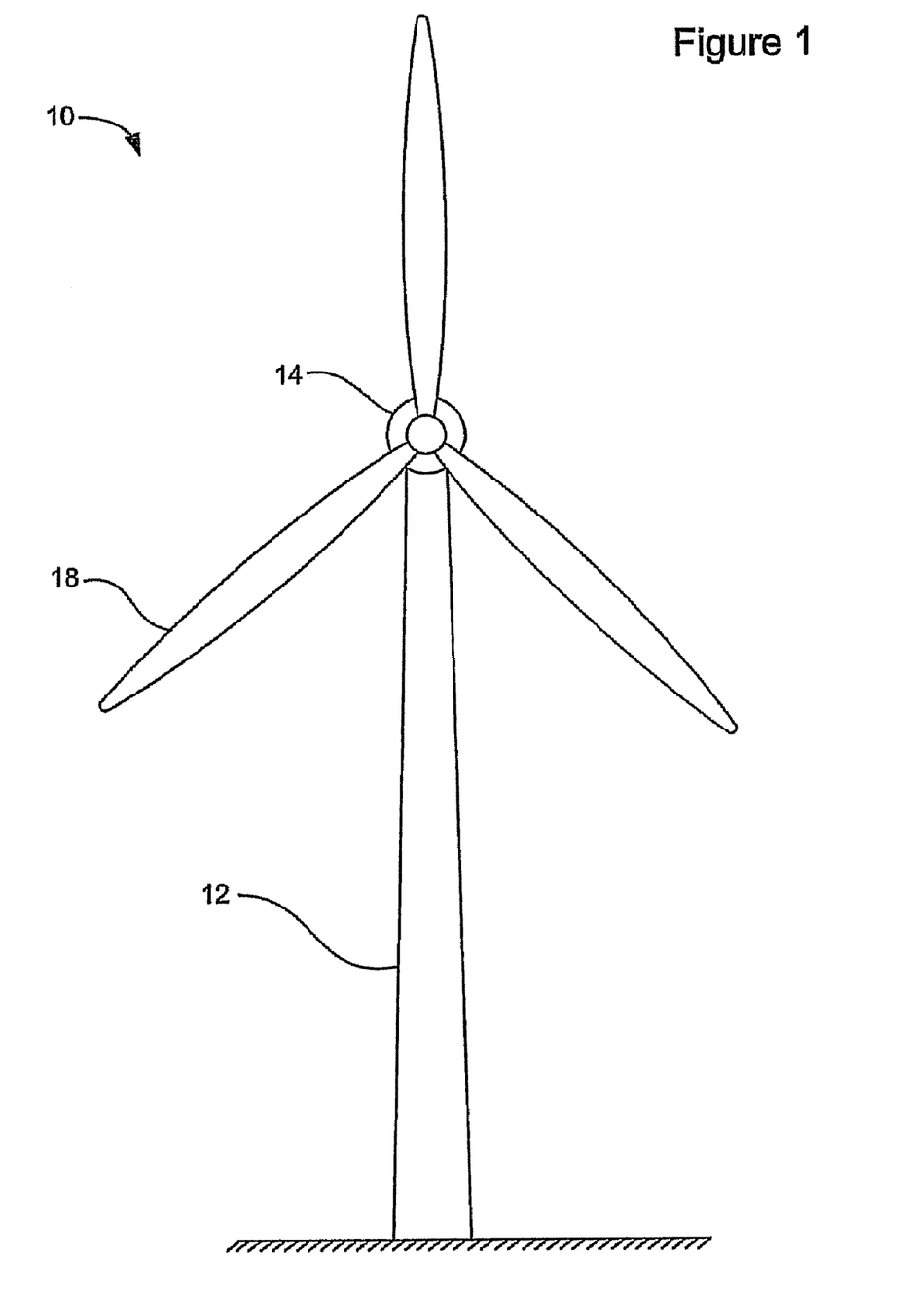
FIG. 1 is a plan view illustrating a wind turbine.
Figure 2:
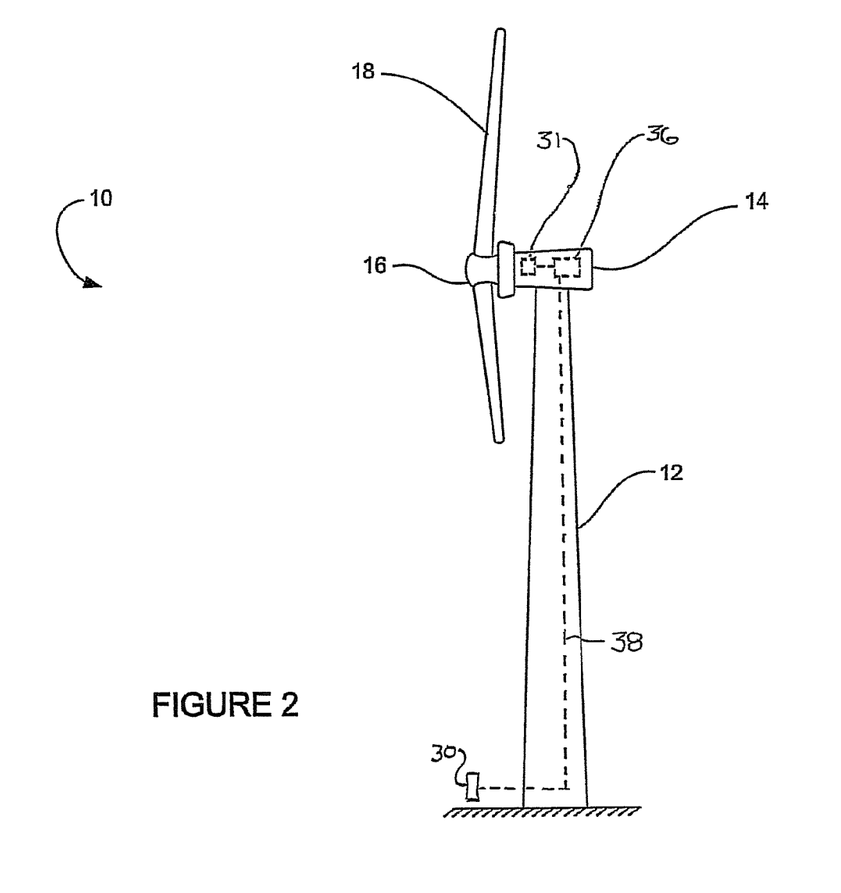
FIG. 2 is a side plan view of the wind turbine of FIG. 1.

Referring to FIG. 1 and FIG. 2, a wind turbine 10 capable of generating electrical power in the 100 kw to 10 MW range is shown. The wind turbine 10 includes a tower 12 which is anchored to the ground by means of a bolted connection to a steel and concrete foundation as will be described in more detail below. On the opposing end of the tower 12, the nacelle 14 is mounted to rotate about the tower 12 to allow the nose cone 16 and the plurality of blades 18 to face into the wind. A generator is positioned between the nose cone 16 and the nacelle 14 which allows the size of the nacelle to be minimized while still allowing all the necessary power electronics and controls to located either in the nacelle 14 itself, or adjacent the top of the tower 12. Alternatively, the power electronics or the controls may be mounted in or next to the tower.

Typically for this size wind turbine, the tower 12 is between 20 and 120 meters in height and constructed of tapered tubular steel of up to 6-meter diameter at the ground and 1-4 meter diameter at the top. The tapered tubular steel tower is constructed in sections to facilitate the transportation and assembly of the wind turbine 10 at its point of use. Alternatively, the tower 12 may be made from a lattice structure or from concrete sections. In the preferred embodiment, there are three turbine blades 18 of 9-90 meters in length that equally spaced around the nose cone 16. While the blades may be made of any suitable material, typically a glass fiber reinforced plastic or epoxy is used to reduce weight while still providing the necessary mechanical strength required to withstand the wind loads. To reduce the complexity of the wind turbine 10 the blades 18 may be of a fixed pitch type. The fixed pitch type blades are typically preferable for smaller wind turbines operated at remote locations due to the increased reliability provided by the fixed pitch arrangement. Alternatively, variable pitch blades may be used and are preferred for larger wind turbines (e.g. greater than 300 kW)

Figure 3:
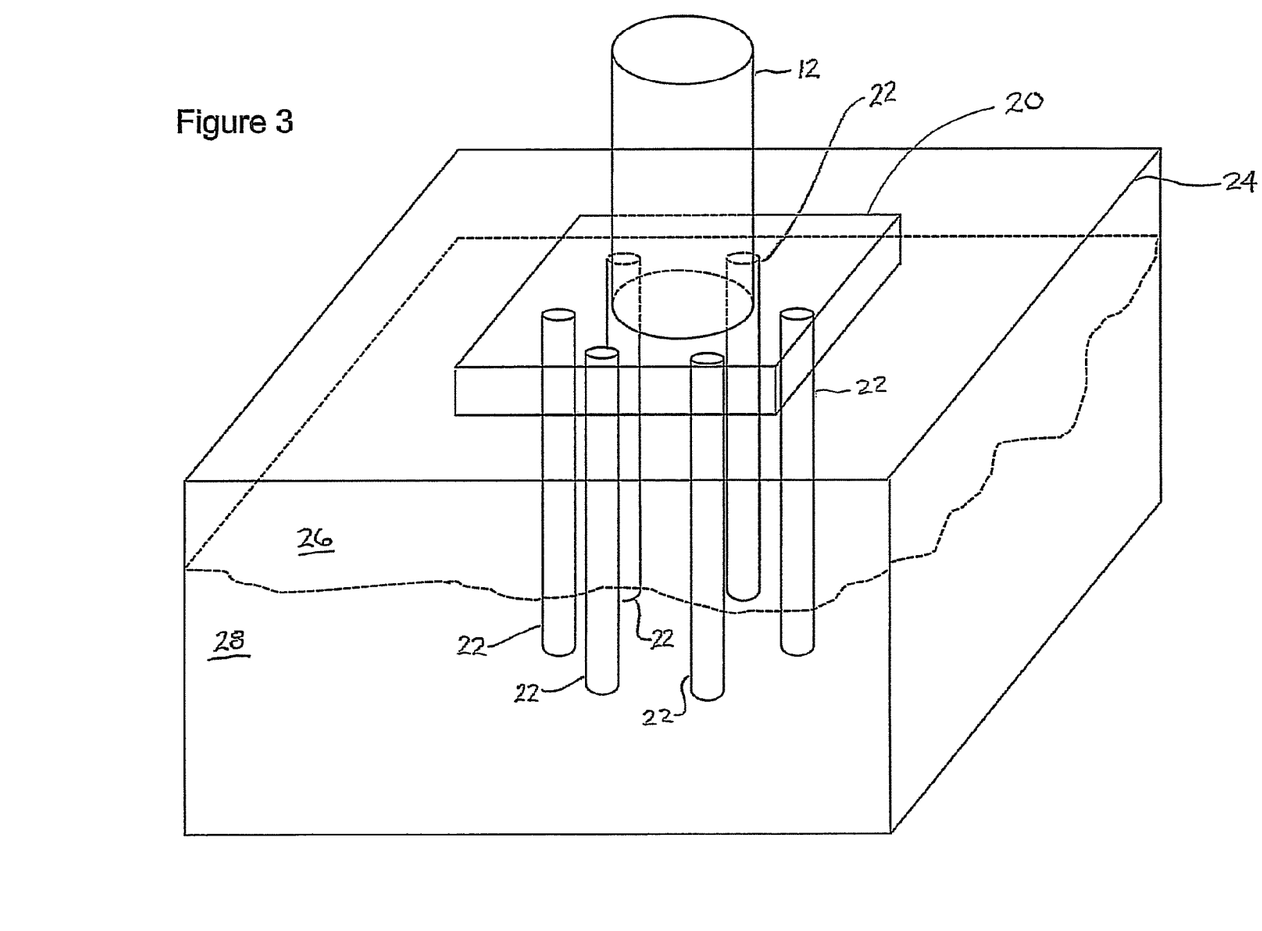
FIG. 3 is a perspective view illustration of a foundation for the wind turbine of FIG. 1.
Figure 4:
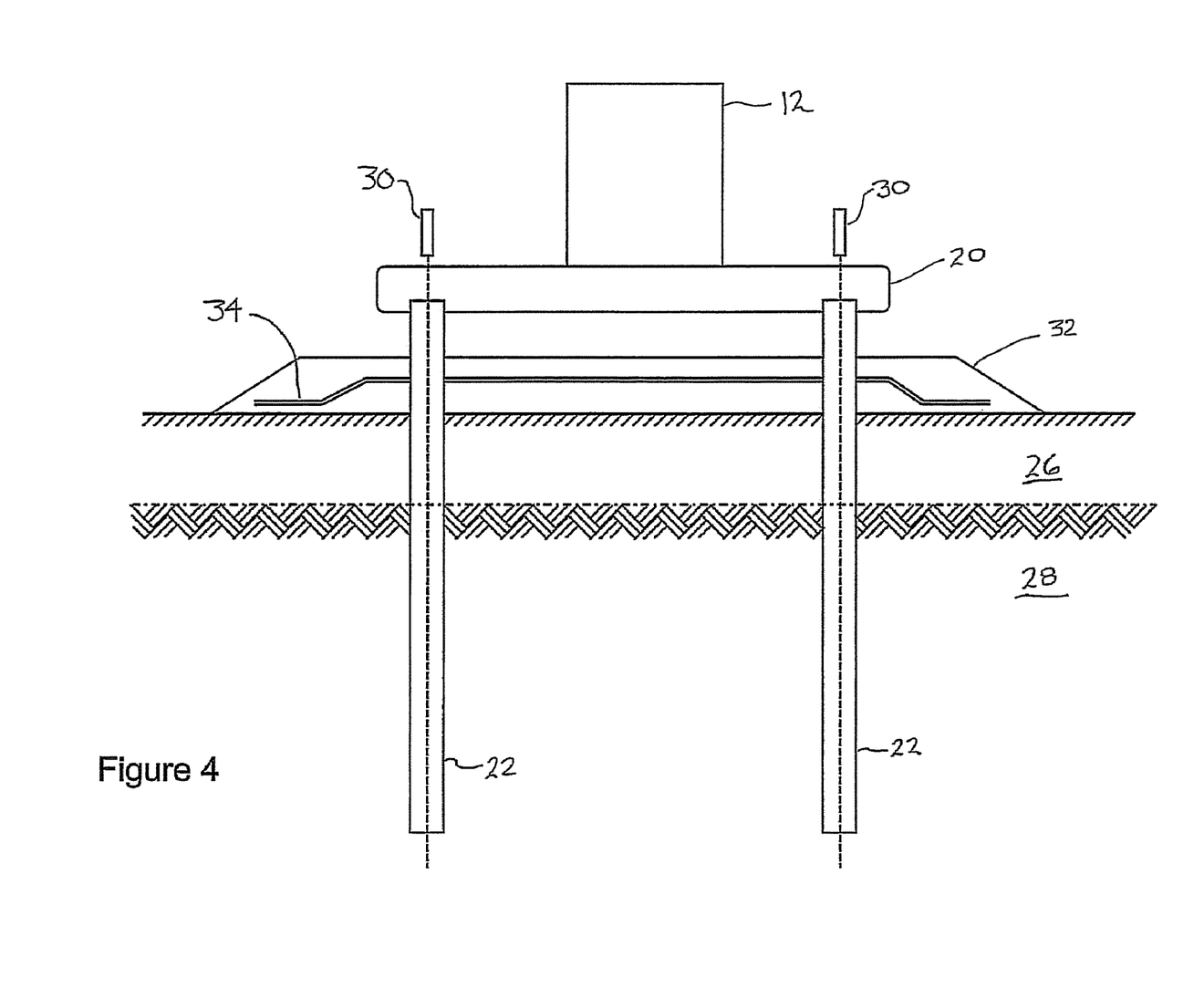
FIG. 4 is a plan view illustration partially in section of the foundation of FIG. 3.

Referring to FIG. 3, the foundation of the wind turbine 10 will be described. The tower 12 is mounted to a concrete platform 20 by a plurality of bolts (not shown) that rigidly secure the tower 12 to the platform 20. In the exemplary embodiment, the platform 20 is approximately 6 meters across, 0.8 meters thick and made from concrete reinforced with steel reinforcing bars. The platform 20 is rigidly mounted to a plurality of pilings 22. The pilings 22 are steel columns that are filled with concrete. Alternatively, the tower 12 may be fabricated on a plain steel frame. The top of the piling 22 is above the surface 24 of the ground and extends through the soil active layer 26 and into the permafrost region 28. Preferably, the piling depth beneath the active layer 26 will be between ⅓ and ⅔ of the height of the tower 12, and more preferably ⅓ the height of the tower 12. In the exemplary embodiment, there are six pilings 22 having a outside diameter of 51 cm supporting the platform 20 and the tower 12. In this embodiment, the pilings 22 are equally spaced in a hexagonal arrangement around the tower 12. In another embodiment, the tower 12 is mounted to a single piling having a large diameter.

Since it is advantageous to keep the active layer 26 beneath the wind turbine 10 small or shallow, in an alternate embodiment, a layer of sand 32 may be arranged beneath the platform 20. The sand layer 32 provides a layer of insulation during warm summer months to reduce the amount of thawing beneath the wind turbine. An optional insulation sheet 34 may be positioned within the sand layer 32 to provide an additional thermal barrier. The insulation sheet 34 may be a rigid foam panel, made from a material such as fiberglass, perlite, phenolic, polyurethane, rigid cellular polystyrene, fiber board or cork. Optionally, a thermosiphon (not shown) may be installed with the insulation sheet 34 to assist in keeping the ground frozen.

Also positioned on the platform 20 are one or more temperature sensors 30. The temperature sensor 30 may be a thermoprobe, a thermocouple, a thermistor, an infrared thermometer, a bi-metal mechanical thermometer, an electrical resistance thermometer, or a pyrometer. In the exemplary embodiment, the temperature sensor 30 is a thermoprobe having a remotely located sensor head that may be positioned at one or more positions along the depth of the piling 22. The temperature sensor is coupled to a controller 36 located in the nacelle 14. As will be discussed in more detail below, the temperature sensor 30 transmits a signal to the controller indicative of the soil temperature at various depths below the surface 24. This allows the controller 36 to determine the depth of the active layer 26 and adapt the operation of the wind turbine 10 to adjust for changing soil conditions.

In an alternate embodiment, the condition of the active layer 26 may be determined indirectly through a sensor 31, such as an accelerometer for example, mounted in the nacelle 14 or at the top of the tower 12. The sensor 31 measures the frequency of motion of the tower 12 during operation. Since the measured frequency, or measured frequency spectrum, for a given operational state will be a function of the amount of support provided by the active layer 26, the condition of the active layer 26 may be indirectly monitored.

In one embodiment, the controller 36 receives the signal from the sensor 31 and converts that signal into a digital representation of the signal. A mathematical operation commonly referred to as a fast fourier transform (FFT) is performed on the digital representation of the signal. The resulting representation forms a spectrum that may be subjected to spectral analysis to determine the location of peaks. The peaks in the spectrum represent the natural frequency of the wind turbine structure. The controller 36 includes executable code that performs the FFT and spectral analysis. Alternatively, the controller 36 may utilize a specialized processor, known as a digital signal processor, that is adapted to efficiently execute and perform these operations. This embodiment provides additional advantages by directly measuring a characteristic of the wind turbine structure that enables the controller 36 to implement corrective action. It should be appreciated that wind turbine 10 may utilize both the temperature sensor 30 and the frequency sensor 31 during operation to determine the natural frequency parameter.

Controller 36 is a suitable electronic device capable of accepting data and instructions, executing the instructions to process the data, and presenting the results. Controller 36 may accept instructions through user interface, or through other means, such as but not limited to electronic data card, voice activation means, manually-operable selection and control means, radiated wavelength and electronic or electrical transfer. Therefore, controller 36 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, or a hybrid of any of the foregoing.

Controller 36 is capable of converting the analog voltage or current level provided by sensors 30, 31 into a digital signal indicative of the depth of the soil active layer adjacent to the pilings 22 and structure frequency respectively. Alternatively, sensors 30, 31 may be configured to provide a digital signal to controller 36, or an analog-to-digital (A/D) converter (not shown) maybe coupled between sensors 30, 31 and controller 36 to convert the analog signal provided by sensors 30 into a digital signal for processing by controller 36. Controller 36 uses the digital signals to act as input to various processes for controlling the system. The digital signals represent one or more system data including but not limited to wind turbine rotor speed, wind speed, generator voltage, generator current, output current, or load power requirements.

Controller 36 is operably coupled with one or more components of system by data transmission media 38. Data transmission media 38 includes, but is not limited to, twisted pair wiring, coaxial cable, and fiber optic cable. Data transmission media 38 also includes, but is not limited to, wireless, radio and infrared signal transmission systems. In the embodiment shown in FIG. 2, transmission media 38 couples controller 36 to temperature sensors 30. Controller 36 is configured to provide operating signals to these components and to receive data from these components via data transmission media 38.

In general, controller 36 accepts data from sensors 30, 31 and is given certain instructions for the purpose of comparing the data from sensors 30 to predetermined parameters. Controller 36 provides operating signals to the wind turbine 10 such as controlling the operating speed of the blades 18. Controller 36 also accepts data from other sensors, indicating, for example, whether the electrical load demand requested by the electrical network. The controller 36 compares the operational parameters to predetermined variances (e.g. natural frequency of the wind turbine 10) and if the predetermined variance is exceeded, generates a signal that may be used to initiate other control methods that adapt the operation of the system to compensate for the out of variance operating parameter. Alternatively, the signal may indicate an alarm to an operator or the computer network. For example, a change in the depth of the active layer 26 may change the natural frequency of the wind turbine 10 structure. Since it is undesirable to operate the wind turbine 10 at a frequency near the natural frequency of the structure, the controller 36 may initiate actions to shift the operating frequency away from the structures natural frequency, or shutdown the wind turbine 10. The controller 36 may, for example, change the wind turbine 10 operational control parameters to increase the operational speed above the tower frequency or reduce the speed below the tower frequency. Alternatively, the controller 36 may have a range of frequencies (a "zone of exclusion") that the wind turbine 10 is prohibited from operating in. The controller 36 may modify this zone of exclusion as the wind turbine structure frequency varies.

The data received from sensors 30 may be displayed on user interface 40, which is coupled to controller 36. User interface 40 may be an LED (light-emitting diode) display, an LCD (liquid-crystal diode) display, a CRT (cathode ray tube) display, or the like. A keypad 42 is coupled to user interface 40 for providing data input to controller 36.

In addition to being coupled to one or more components within wind turbine system 10, controller 36 may also be coupled to external computer networks such as a local area network (LAN) 44 and the Internet. LAN 44 interconnects one or more remote computers, which are configured to communicate with controller 36 using a well-known computer communications protocol such as TCP/IP (Transmission Control Protocol/Internet(^) Protocol), RS-232, ModBus, and the like. Additional wind turbine systems 10 may also be connected to LAN 44 with the controllers 36 in each of these wind turbine systems 10 being configured to send and receive data to and from remote computers and other wind turbine systems 10. LAN 44 may also be connected to the Internet. This connection allows controller 36 to communicate with one or more remote computers connected to the Internet.

Figure 6:
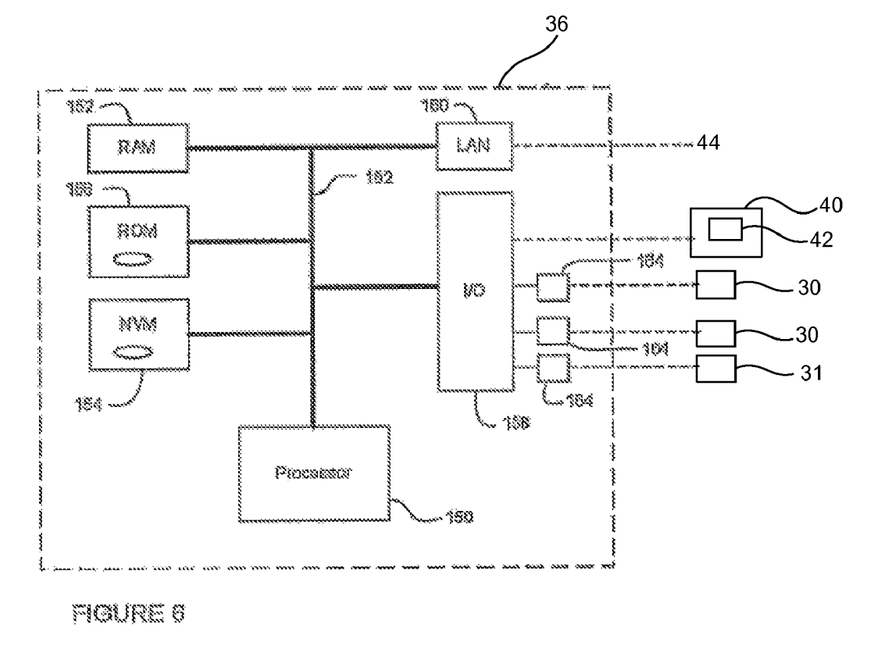

Referring now to FIG. 6, a schematic diagram of controller 36 is shown. Controller 36 includes a processor 150 coupled to a random access memory (RAM) device 152, a non-volatile memory (NVM) device 154, a read-only memory (ROM) device 156, one or more input/output (I/O) controllers 158, and a LAN interface device 160 via a data communications bus 162.

I/O controllers 158 are coupled to temperature sensors 30, 31, keypad 42, and user interface 40 for providing digital data between these devices and bus 162. I/O controllers 158 are also coupled to analog-to-digital (A/D) converters 164, which receive analog data signals from sensors 30, 31. It should be appreciated that I/O controllers 158 may have additional inputs from other sensors and devices within the wind turbine 10 to provide the control functionality to the wind turbine 10.

LAN interface device 160 provides for communication between controller 36 and LAN 44 in a data communications protocol supported by LAN 44. ROM device 156 stores an application code, e.g., main functionality firmware, including initializing parameters, and boot code, for processor 150. Application code also includes program instructions for causing processor 150 to execute any power conversion system operation control methods, including starting and stopping operation, monitoring predetermined operating parameters such as coolant fluid temperature, and generation of alarms. The application code creates an onboard system that may be used to transmit operating information between the wind turbine 10 and other receiving locations. The information to be exchanged between remote computers and the controller 36 include but are not limited to soil temperature, generator status, generator power output, input current, input voltage, power converter status, output voltage, output current, output power, load demands, coolant fluid temperature, geographic location, and alarm status.

NVM device 154 is any form of non-volatile memory such as an EPROM (Erasable Programmable Read Only Memory) chip, a disk drive, or the like. Stored in NVM device 154 are various operational parameters for the application code. The various operational parameters can be input to NVM device 154 either locally, using keypad 42 or a remote computer, or remotely via the Internet using a remote computer. It will be recognized that application code can be stored in NVM device 154 rather than ROM device 156.

Controller 36 includes operation control methods embodied in application code. These methods are embodied in computer instructions written to be executed by processor 150, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Marlcup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Figure 5:
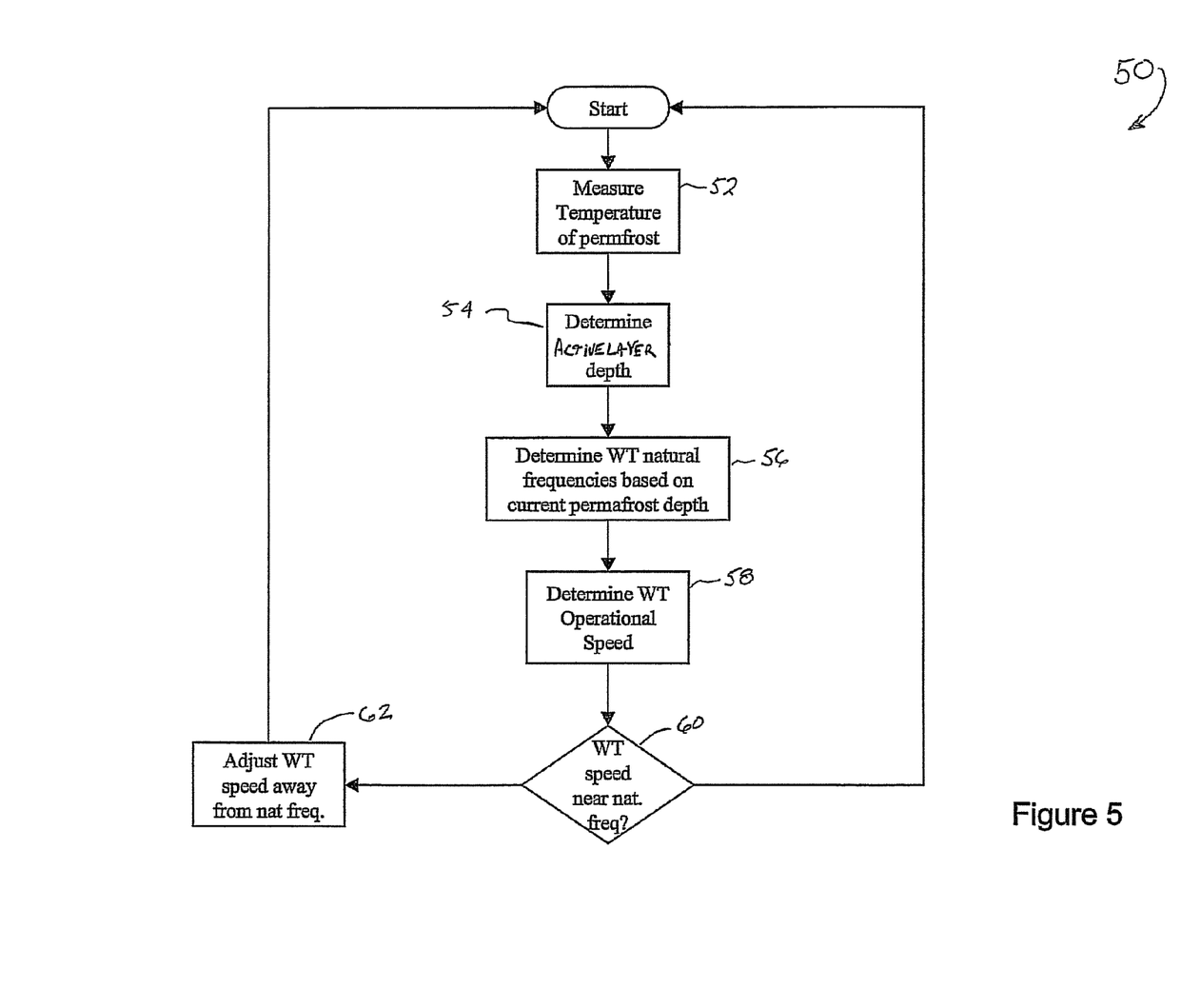
FIG. 5 is a flow chart of the control system of the wind turbine of FIG. 1; and, FIG. 6 is a schematic illustration of a controller for use with the wind turbine of FIG. 1.

During operation, the controller 36 may execute one or more processes to affect the control of the wind turbine 10. One such process 50 is executed on the controller 36 to ensure that any changing soil conditions do not change the natural frequency of the wind turbine 10 structure in a manner that brings the natural frequency of the structure closer to the operating frequency of the turbine blades 18. It should be appreciated that a wind turbine 10 will have a natural frequency at which the structure resonates. One parameter that affects the structures natural frequency is the height of the tower 12 and nacelle 14. This height is measured not from the surface 24, but rather from the top layer of the permafrost 28. Since the active layer 26 changes depth not only on a seasonal basis, but also over time, the natural frequency of the wind turbine 10 structure will also change.

It is undesirable to operate a wind turbine at or near its natural frequency since this would result increased vibrational amplitude creating unwelcome noise emissions and increased fatigue on the structural components. Since the natural frequency of the wind turbine 10 will change over time due to increasing average annual temperatures, the natural frequency may over time, encroach on the operating frequency of the wind turbine, at least during the warmer summer months when the active layer 26 thaws. To avoid this situation, the process 50 monitors 52 the temperature of the soil at a variety of depths. From this temperature data, the process 50 determines 54 the depth of the permafrost. The determination of the permafrost depth may be accomplished by a number of methods, including direct measurement at a large number of depths, or may be calculated by interpolation between few measurement points, for example. Alternatively, the depth may be determined indirectly where the natural frequency is directly calculated using measurements from accelerometer 31.

Once the depth of the permafrost is known, the controller can determine 56 the natural frequency of the wind turbine 10 structure based on the height of the tower and nacelle above the permafrost layer 28. The natural frequency may be retrieved by process 50 using the spectral analysis described above, or via a look-up table which includes the natural frequency as a function of soil active layer depth. Alternatively the natural frequency may be calculated by using a simple cantilever beam model or other such analytical method. Once the natural frequency is determined, the operation speed of the wind turbine 10 is ascertained 58 and the wind turbine operation frequency is compared 60 to the natural frequency.

If the comparison shows that the natural and operational frequencies are sufficiently different to prevent the undesired effects discussed above, then the process 50 loops back to the beginning and repeats. If the natural frequency moves close to the operational frequency, then the process 50 initiates actions 62 to increase the difference between the two frequencies. These actions may include slowing the turbine blades 18 by using a mechanical or electromagnetic brake, changing a generator controller torque speed curves, or changing the speed or power setpoint to force the wind turbine 10 to run at a lower speed. Alternatively, a zone of exclusion could be implemented. For example, if the tower 12 frequency coincided with an operational speed below the rated wind turbine speed, the controller 36 could prevent the wind turbine 10 from operating within the zone of exclusion. Allowing the turbine blades 18 to operate at a higher speed, or if necessary shutting down the wind turbine 10. It should be appreciated that the process 50 may also include a variance or range of frequencies around the operational and natural frequencies and if the ranges overlap, then the process 50 initiates corrective action. Once the operation of the wind turbine 10 has been adjusted, the process 50 loops back to the beginning and repeats.

It should be appreciated that the operation of wind turbine 10 with process 50 provides advantages in the design and construction of wind turbines 10 in areas having permafrost. By being able to adjust the operation of the wind turbine 10 to take into account changing soil conditions not only over the course of seasons, but also over the course of time, the construction of towers and foundations may be simplified. Wind turbines often have a long life expectancy, typically on the order of twenty to thirty years or more. The builder of the wind turbine will not need to estimate the impacts of global climate change on soil conditions and wind turbine 10 operation. This allows the use of a less conservative design in the tower and foundation that saves on installation costs and extends the life of the wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a wind turbine, the wind turbine attached to a foundation that is coupled to at least one piling that extends into a plurality of soil layers, wherein at least one of the plurality of soil layers is an active soil layer, the method comprising:
   monitoring the seasonably variable piling support characteristics of the active soil layer, wherein said monitoring includes:
     sensing a condition of the active soil layer;
     determining changes in the sensed condition; and
     transmitting the changes in condition to a control system;
   determining the depth of the active soil layer based upon the changes in the sensed condition; and
   controlling the wind turbine based upon the depth of the active soil layer.

2. A method of controlling a wind turbine according to claim 1 wherein the sensed condition is the natural frequency of the wind turbine.

3. A method of controlling a wind turbine according to claim 2 wherein said controlling includes changing the operational frequency of a plurality of turbine blades.

4. A method of controlling a wind turbine according to claim 3 wherein the sensed condition is the temperature of the active soil layer.

5. A method of controlling a wind turbine according to claim 3 wherein the sensed condition is a tower frequency.

6. A method of controlling a wind turbine according to claim 5 further comprising the step of determining a natural frequency using the tower frequency.

7. A method of controlling a wind turbine according to claim 6, wherein the condition is a temperature.

8. A method of controlling a wind turbine according to claim 7, wherein the condition is a tower frequency.

9. A method of controlling a wind turbine according to claim 6, wherein the condition is a moisture content.

10. A method of controlling a wind turbine according to claim 6, wherein the condition is a tower frequency.

11. A method of determining a natural frequency of a wind turbine with a tower having a height, the wind turbine resting on a foundation having pilings of a selected size disposed in an active soil layer, the method comprising:
   measuring a characteristic representative of a condition of the active soil layer;
   determining the depth of the active soil layer based on the characteristic; and
   determining the natural frequency of the wind turbine based upon the depth of the active soil layer, tower height, and size of the pilings.

12. A method of controlling a wind turbine according to claim 11, wherein the characteristic representative of a condition of the active soil layer is a temperature.

13. A method of controlling a wind turbine according to claim 12, wherein the characteristic representative of a condition of the active soil layer is a tower frequency.

14. A method of controlling a wind turbine according to claim 11, wherein the characteristic representative of a condition of the active soil layer is a moisture content.

15. A method of controlling a wind turbine according to claim 11, wherein the characteristic representative of a condition of the active soil layer is a tower frequency.

16. A method of controlling a wind turbine according to claim 11, further including controlling the wind turbine based upon the depth of the active soil layer.

17. A method of controlling a wind turbine according to claim 16, wherein said controlling includes changing the operational frequency of a plurality of turbine blades based on the natural frequency.

18. A method of controlling a wind turbine according to claim 17, wherein the characteristic representative of a condition of the active soil layer is a temperature.

19. A method of controlling a wind turbine according to claim 18, wherein the characteristic representative of a condition of the active soil layer is a tower frequency.

20. A method of controlling a wind turbine according to claim 18, wherein the characteristic representative of a condition of the active soil layer is a moisture content.

21. A method of controlling a wind turbine according to claim 17, wherein the characteristic representative of a condition of the active soil layer is a tower frequency.

* * * * *